Jan. 20, 1925.

J. LILLESOE 1,523,697

SIDE CAR FOR MOTOR CYCLES

Filed Sept. 3, 1921

Inventor:
J. Lillesoe,
By Marks & Clerk
Attys.

Patented Jan. 20, 1925.

1,523,697

UNITED STATES PATENT OFFICE.

JENS LILLESOE, OF COPENHAGEN, DENMARK.

SIDE CAR FOR MOTOR CYCLES.

Application filed September 3, 1921. Serial No. 498,523.

*To all whom it may concern:*

Be it known that I, JENS LILLESOE, a subject of the King of Denmark, residing at Copenhagen, Denmark, have invented certain new and useful Improvements in Side Cars for Motor Cycles (for which I have filed an application in Denmark June 29th, 1920, Patent No. 29069), of which the following is a specification.

The present invention has reference generally to improvements in that class of invention known as motor vehicles and more particularly relates to side cars for motor cycles.

It is the primary aim and object of the present invention to provide a device of the above mentioned character wherein improved means is employed for mounting the side wheel to the side car to ensure of a smooth running of the combination and minimizing the strain on the side car.

Other objects as well as the nature, characteristic features and scope of the invention will be more readily understood from the following description taken in connection with the accompanying drawing and pointed out in the claim forming a part of this specification.

The invention is clearly illustrated in the accompanying drawing in which:—

Figure 1:
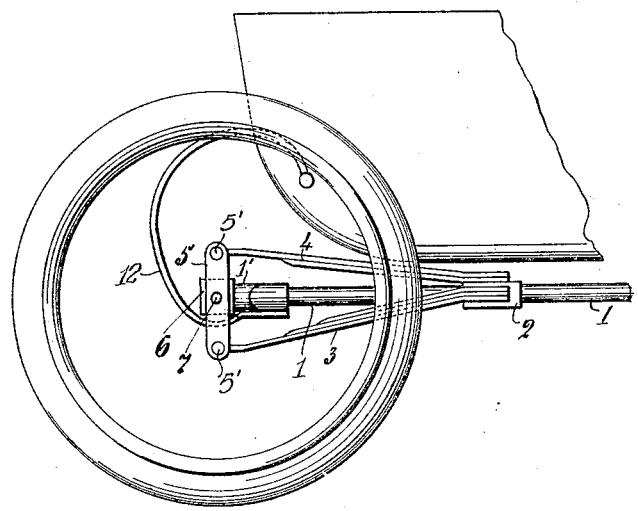
Fig. 1 is a side elevation of a side car showing the improved means for mounting the wheel to the chassis of the side car.
Figure 2:
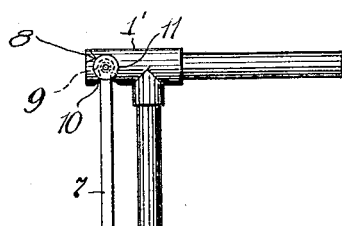
Fig. 2 is a plan view of the same showing how the wheel is resiliently supported with respect to the chassis.
Figure 3:
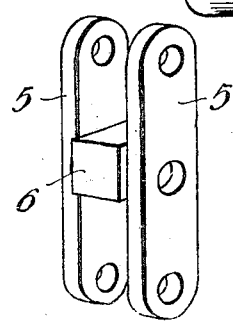
Fig. 3 is a perspective detail of the rigidly connected cross members and bearing block.
Figure 4:
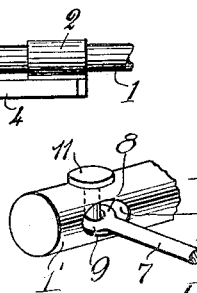
Fig. 4 is an enlarged perspective detail of the connection between the inner end of the axle and side bar of the chassis.

Referring now, more particularly, to the accompanying drawing the side car includes a chassis 1 which has at the side bar near the wheel an attachment 2 for the forward ends of a pair of laminated springs 3 and 4, the rear ends of the springs being pivotally connected between the adjacent ends of spaced cross members 5 by bolts 5'. A spacing and bearing block 6 between the members 5 is rigidly connected thereto so as to be movable therewith. An axle 7 has its outer end mounted in said block and centrally of said cross bars. This axle 7 is prolonged inwardly and fitted at the inner end as at 8 to the inner side bar 1' of the side car chassis near the motor cycle, so that sufficient stability against the side pressure is ensured and as the two springs 3 and 4 exercise opposite spring action every shock on the side car wheel will be almost instantly absorbed so that even with heavy shocks the motor cycle will receive no strain worth mentioning in the side direction. The connection 8 may be of a conventional type in the present instance including an enlarged eye 9 on the inner end of the axle 7 which is inserted through an opening 10 in the hollow end portion 1' of the side bar chassis. A vertically disposed bolt 11 is engaged through the portion 1' of the bar, the shank thereof also loosely engaging the eye 9 so that the axle may be permitted the movement described. In this connection it is to be noted that the lower spring is stronger than the upper spring so that with a normal load only the side car is in a level position.

A bowed spring 12 has one end connected to the body of the side car and the other end connected to the under surface of the outer side bar of the chassis being passed beneath the axle in such manner so as to permit of the necessary movement thereof.

The invention presents also the advantage that the wheel, being placed as shown between two oppositely situated laminated springs set at an acute angle, is bound to follow a straight line parallel with the rear wheel of the motor cycle and without side play, thus protecting the side car tire from any undue strain.

It is believed in view of the foregoing that a further detailed description of the operation of the invention is entirely unnecessary. Likewise it is believed that the advantages will be readily apparent.

Having thus fully described the invention what is claimed as new and desired to be secured by Letters Patent is:—

A mount for car wheels of a side car for motor cycles comprising a chassis including inner and outer side bars, an elongated wheel supporting axle connected at its inner end to the rear end of the inner side bar, a cross member through which the outer portion of the axle is mounted, a pair of leaf springs with opposite spring action having their rear ends connected with the upper and lower ends of the cross member and means for attaching the ends of the springs to the outer side bar chassis, substantially as and for the purposes set forth.

In testimony whereof I affix my signature in presence of two witnesses.

JENS LILLESOE.

Witnesses:
 CHAS. UNDR,
 L. MÓLGAARD.